L. BINNS.
Endless Bands.

No. 143,743. Patented Oct. 21, 1873.

WITNESSES:
Jas. L. Ewin
Walter Allen

INVENTOR:
Leedham Binns
By Knight Bro. Attorneys.

UNITED STATES PATENT OFFICE.

LEEDHAM BINNS, OF OAKENSHAW, NEAR BRADFORD, ENGLAND.

IMPROVEMENT IN ENDLESS BANDS.

Specification forming part of Letters Patent No. 143,743, dated October 21, 1873; application filed August 25, 1873.

*To all whom it may concern:*

Be it known that I, LEEDHAM BINNS, of Oakenshaw, near Bradford, in the county of York, England, have invented certain Improvements in the Manufacture of Endless Bands, Cords, or Ropes, of which the following is a specification:

Hitherto endless bands, cords, or ropes have been manufactured of india-rubber, gutta-percha, cord, or other material cut into lengths, the ends of which have been cemented or otherwise fastened together; but according to my invention, I manufacture endless bands, cords, or ropes complete and entire without the necessity for connecting the ends together after the separate previous manufacture of the band, cord, or rope. For this purpose I employ yarn, twist, cord, wire, or other suitable material.

Figure 1:
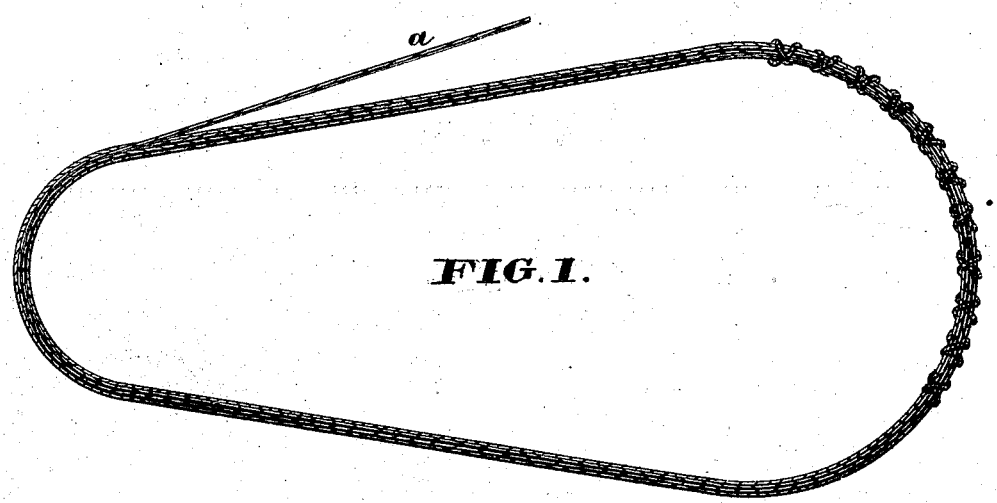
Figure 2:

Figure 1 represents the core of an endless band in course of manufacture according to my invention. Fig. 2 represents a portion of the finished band.

The material is wrapped around guides or pulleys placed a suitable distance apart, with the strands $a$ lying close together, until the desired size and strength are obtained for the core of the band. The material is then severed from its source of supply, and the end properly secured.

After the core has been thus formed I connect thereto the ends of one, two, or more strands of material to form the covering of the desired band, and I wind, twist, or braid such covering-strands around the core until it arrives at or a little beyond the point where it was first applied, when the ends are severed from the source of supply and fastened in any suitable manner.

When using more than one strand, $b$, of covering material, I wind or twist such strands in contrary directions around the core, as shown in Fig. 2.

Endless bands, cords, or ropes, according to my invention, may be made by hand; but for the sake of speed, economy, and efficiency, I employ machinery or apparatus, which is fully described in my application for Letters Patent of the United States therefor, filed February 26, 1873.

If desired, instead of winding or twisting the covering material around the core, it may be braided or plaited around it by mechanism of a similar construction to that employed in covering certain descriptions of window-cord.

I am aware of the patent to Justus A. Traut, dated March 26, 1867, for a polishing belt, consisting of an endless band of fabric covered with rubber and coated with emery; and also the patent to Henry Richards and Justus A. Traut, dated September 29, 1868, for a polishing-belt, consisting of an endless piece of woven fabric; and I do not claim any of the features therein shown and described.

Having described my invention, I claim as new and desire to secure by Letters Patent—

Endless bands, cords, or ropes, made complete and entire by first forming the core of a suitable number of strands and then covering said core, substantially as described, with strands of fibrous material or wire wound around it.

LEEDHAM BINNS.

Witnesses:
   CHAS. M. WHITE,
      35 *Southampton Buildings, London.*
   H. DUPONT,
      *St. Michael's Buildings,*
           *Cornhill, London.*